Patented Jan. 16, 1923.

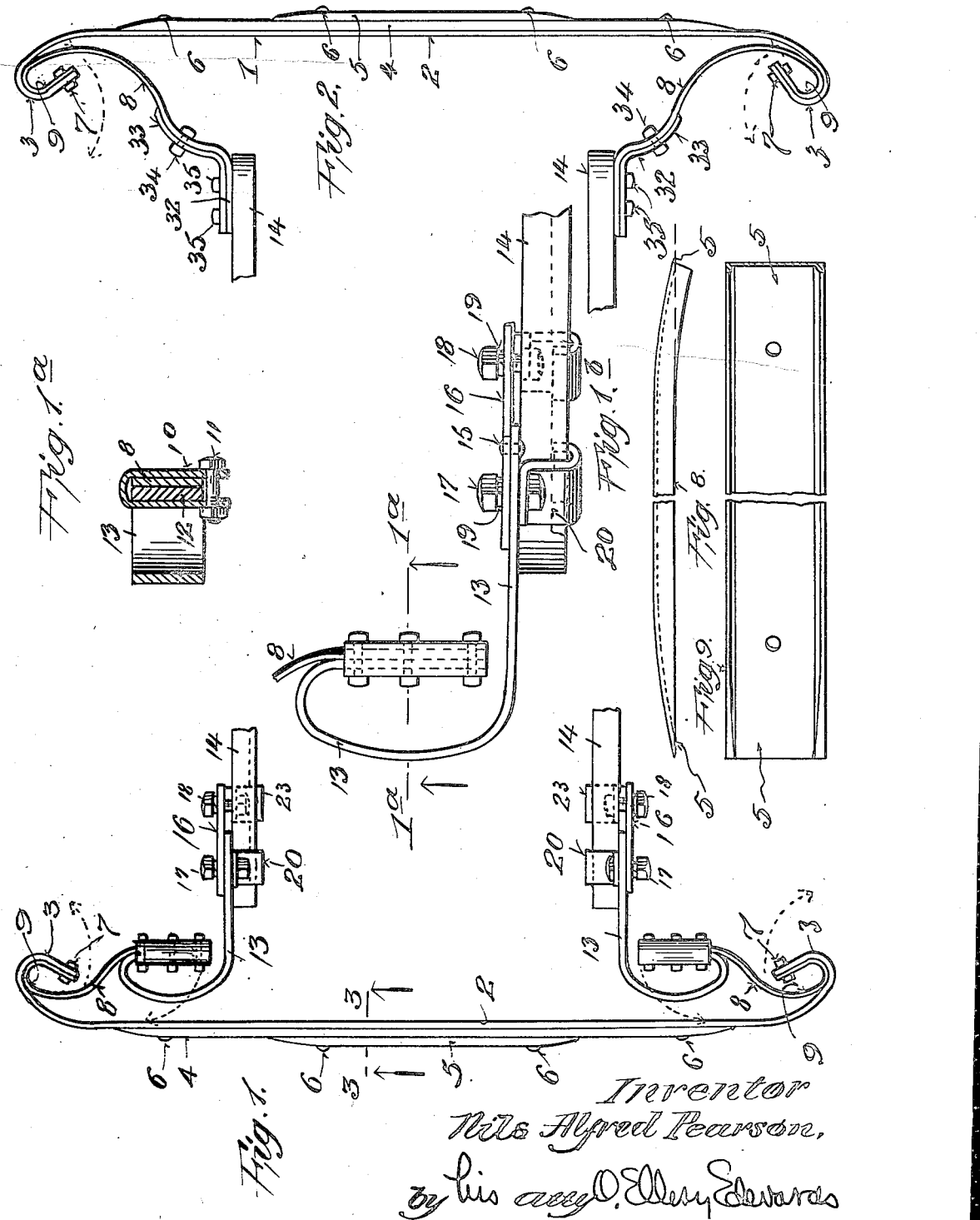

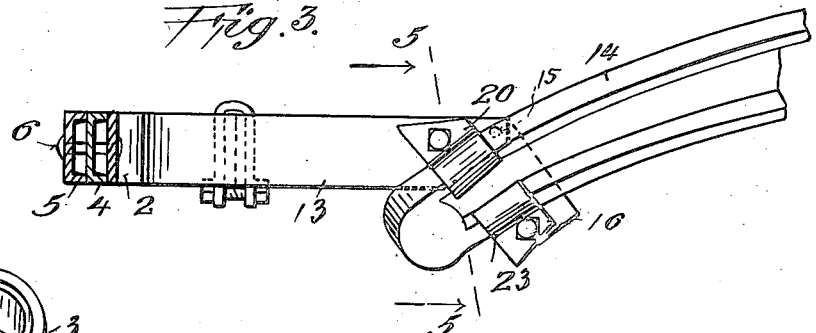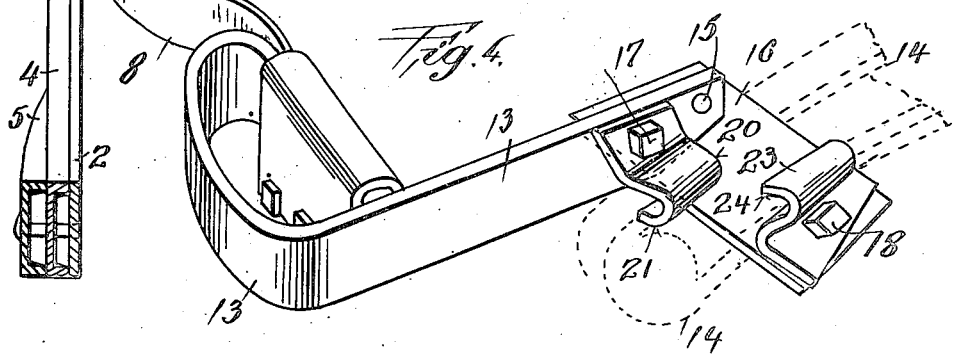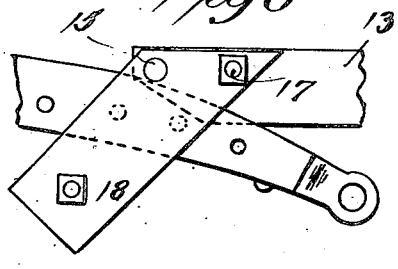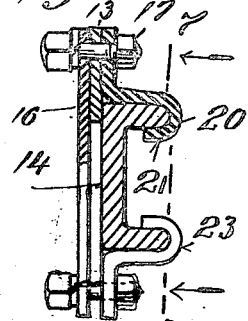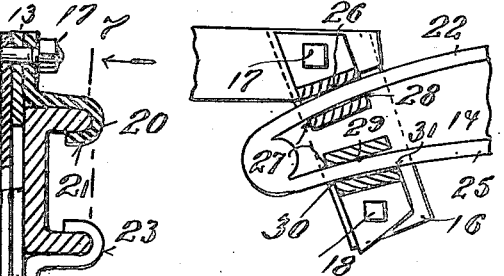

1,442,493

UNITED STATES PATENT OFFICE.

NILS ALFRED PEARSON, OF NEW YORK, N. Y.

BUMPER FOR AUTOMOBILES.

Application filed August 7, 1920. Serial No. 401,882.

*To all whom it may concern:*

Be it known that I, NILS ALFRED PEARSON, a subject of the King of Sweden, and a resident of the city of New York, county of Kings, and State of New York, have invented a new and useful Improvement in Bumpers for Automobiles, of which the following is a specification.

The object of my invention is to provide a bumper of good appearance which will be strong and resilient until the springs are compressed to their limits and then the bumper will rest against nearly rigid supports which are directly connected to the frame of the machine so that when a collision is had with an object, the bumper will first act as a spring and finally as a rigid part of the frame and thereby save the automobile.

A further object is to provide a durable, light and efficient bumper which under normal conditions will always maintain its true relation to the car and be ready for emergency use.

Yet a further object is to provide a bumper which will never become loose or separated from the car while in use, regardless of any vibrations or stresses to which it may be subjected.

These and other objects are accomplished by my invention, some embodiments of which are hereinafter more particularly set forth.

For a more specific description of my invention, reference is to be had to the accompanying drawings, forming a part hereof, in which Figure 1 is a plan view of my improved bumper.

Figure 1ª is a sectional view taken on the line 1ª—1ª of Figure 1ᵇ, looking in the direction of the arrows.

Figure 1ᵇ is an enlarged plan view of a portion of a bumper supporting spring and bracket.

Figure 2 is a modification of my invention, suitable for the rear of a car, the other views herein showing the bumper or its parts when adapted to the front of a car.

Figure 3 is a sectional view on the line 3—3 of Figure 1, looking in the direction of the arrows.

Figure 4 is a large perspective view of the right side of my improved bumper when viewed from a seat in the car.

Figure 5 is a sectional view taken on the line 5—5 of Figure 3, looking in the direction of the arrows.

Figure 6 shows a portion of a supporting bracket.

Figure 7 is a sectional view taken on the line 7—7 of Figure 5, looking in the direction of the arrows.

Figures 8 and 9 show a reinforcing bar, complete at the left and ready for the flanges to be ground off to the dotted line at the right of Figure 8.

Throughout the various views of the drawings, similar reference characters designate similar parts.

My improved bumper 1 is composed of a spring 2 havings its ends 3 bent in upon itself, as indicated, and its center is reinforced by two channel bars, a longer 4 and a shorter 5, which are held in place by suitable rivets or screws 6 with rounded heads. The channel bar 5 rests on the channel bar 4 and both channel bars have their center webs bent and their flanges ground straight so that when these channels are in position, they look like solid bars. These channels are very rigid in proportion to their weight, and the bar 4 extends through substantially the entire part of the spring 2 where it is straight, so that when this spring 2 and its supporting springs, which will be described below, have been flexed to their maximum under the strains of use when there is a violent collision, the reinforcing bar 4 will be opposite the supporting springs and rest adjacent to them so as to make a rigid connection through them to the frame of the car to which the bumper is attached. It will be noted from the foregoing that the bumper 1 is resilient at the ends only and thereafter the length of the bar 4 is made as rigid as possible. It is also to be understood that as many channels may be employed as desired. In the preferred embodiment of my invention, I have heretofore used two, as shown.

The free ended loops of the springs 3, are secured by bolts 7 which are provided with lock nuts or other securing means, not shown, and these bolts connect their respective ends with middle springs 8 which have one end 9 curved to correspond to the ends 3 and the other ends straight and parallel with the straight bar of the spring 2. This straight end is engaged by an inverted U clamp 10 which has its lower ends connected by bolts 11 and which binds the straight end of the middle spring to a corresponding straight end 12 of a relatively thicker spring support 13. This spring support 13 has its forward portion adjacent to the spring 2 and has its rear end extending substantially perpendicular thereto and in a suitable position with regard to the front end of the frame 14 of the automobile. The bumper is attached so that the spring support 13 and the frame 14 may be rigidly secured together, the lower corner of the part 13 being cut away to avoid rivets in the frame 14 and so secure a firm bearing against the frame 14.

It is essential that this connection should be very firm and rigid because once there is a collision and the bumper 1 is against the spring supports 13 it is essential that the bumper should be absolutely rigid with the frame 14. This cannot be done without a special attachment such as the one which will now be described.

The spring 13 has a hole at its rear end in which is fixed a laterally extending pin 15 on which a plate 16 is pivoted. This plate 16 carries two bolts 17 and 18 and each of these is provided with a suitable lock nut 19. The bolt 17 passes through a suitable perforation in the spring support 13 and also through a bracket 20 which has a straight flange 21 bent so that its end is parallel with the plate 16 and it thus forms a flat hook which takes under a corresponding flange 22 of the frame 14.

The lower end of the plate 16 carries a corresponding bracket 23 with a flange 24 which is secured by a bolt 18 in a corresponding manner, and this bracket 23 engages a lower flange 25 of the frame 14 which is also curved, as shown in Figure 7.

As the extreme ends of the brackets 20 and 23 are straight and the flanges 22 and 25 are curved, it is obvious that each bracket has three points of contact with its flange which points are designated 26, 27, 28, 29, 30 and 31. Experience has shown that when the bumper 1 is supported, as above described, and a collision is had which forces the parts, as indicated by the arrows in Figure 1, only the bumper rests against the supporting springs 13 and the bumper 1 and frame 14 then become rigid, that under these circumstances the supporting brackets 20 and 23 hold firm and do not give in the least so that the rigidity of the structure under conditions is preserved.

In the foregoing, I have described my improved bumper as it is used in front of a car. In Figure 2, I have shown it attached to the rear in a manner which I will now describe. Here the spring 8 is connected to the bumper 1 the same as before through a bent portion 9 and a bolt 7, but its rear end is bent so as to leave a space between the car and the rear bumper 1 for extra tires or wheels and its extreme rear end 32 is reinforced by a suitable spring steel leaf 33 to which it is secured by means of bolts 34, and other bolts 35 secure the bracing 33 and end 32 to the frame 14. Obviously the rear bumper may be secured as is the front bumper, if desired.

In both embodiments of my invention where there is a collision, either at the front or rear, the spring ends 3 of the bumper give as indicated by the dotted lines in Figure 1, and so do the springs 8. In the case of the front bumper, when the free height of the springs is exhausted, the bumper rests against the spring support 13 and in the case of the rear bumper under corresponding circumstances, the springs 8 give so as to distend the loops and so absorb the shock.

While I have shown and described certain embodiments of my invention, it is obvious that it is not restricted thereto, but that it is broad enough to cover all structures that come within the scope of the annexed claims.

Having thus described my invention, what I claim is:

1. A resilient bumping member provided with free ended loops, a spring with a loop secured to each end of the bumper and supporting springs secured to the looped springs.

2. A resilient bumping member having free ended loops, spring loops secured to the free ended loops, each of said spring loops being provided with a straight shank and supporting springs secured to the straight shanks.

3. A resilient bumping member having free ended loops, spring loops secured to the free ended loops, each of said spring loops being provided with a straight shank and loop supporting springs secured to the straight shanks.

4. A resilient bumping member having free ended loops, spring loops secured to the free ended loops, each of said spring loops being provided with a straight shank and loop supporting springs secured to the shanks by clamps.

5. A resilient bumping member having free ended loops, spring loops secured to the free ended loops, each of said spring loops being provided with a straight shank and loop supporting springs secured to the shanks by U clamps.

6. A resilient bumping member with free ended loops and a channel bar fixed thereto.

7. A resilient bumping member with a channel bar provided with tapered ends fixed to the bumping member.

8. A resilient bumping member with a plurality of channel bars secured to the same, each end of each channel bar being tapered.

9. A resilient bumping member with a reinforcing channel bar secured thereto, the ends of the channel bar being tapered by having the flanges and web bent towards the bumping member and made flush with the surface of the bumping member.

10. Means for supporting a bumping member from a car frame comprising a plate, a pair of bolts passing therethrough and a bracket secured to each bolt and adapted to engage a flange of a car frame with a three point contact.

11. Means for supporting a bumping member comprising a spring, a plate pivotally connected thereto, a bolt passing through the plate and spring and a second bolt passing through the plate only and a pair of brackets, one bracket being secured to each bolt, and each bracket adapted to engage a flange on a frame.

12. A resilient bumping member having free ended loops, a loop spring at each end and adapted to engage and cooperate with the corresponding loop of the bumping member and supporting loops secured to the spring of greater strength and firmness, and means for securing the supporting loops to the springs.

13. A bumping member with free looped ends, a car frame with supporting spring loops fixed thereto, loop springs connecting the free ended loops of the bumping member with the loops of the supporting members so that when the bumping member is forced to the gear, the springs may give until the bumping member rests directly against the supporting loops and thereby becomes for all practical purposes, rigidly connected with the frame.

14. A resilient bumping member having flat spring ends, a riveted automobile frame, and means for securing the flat spring ends directly to the frame adjacent to the rivets so that a side of the frame engages a side of the spring without interference with the rivets.

15. A plate with bolts and a bracket secured to each bolt, each bracket having a flange engaging hook of substantially rectangular cross section and a perforated, flanged body portion through which the bolt passes.

NILS ALFRED PEARSON.